No. 889,966. PATENTED JUNE 9, 1908.
C. W. RAUSCH & F. J. SCHWARZ, Jr.
PIVOT SCREW FOR SHEARS.
APPLICATION FILED DEC. 19, 1906. RENEWED NOV. 5, 1907.
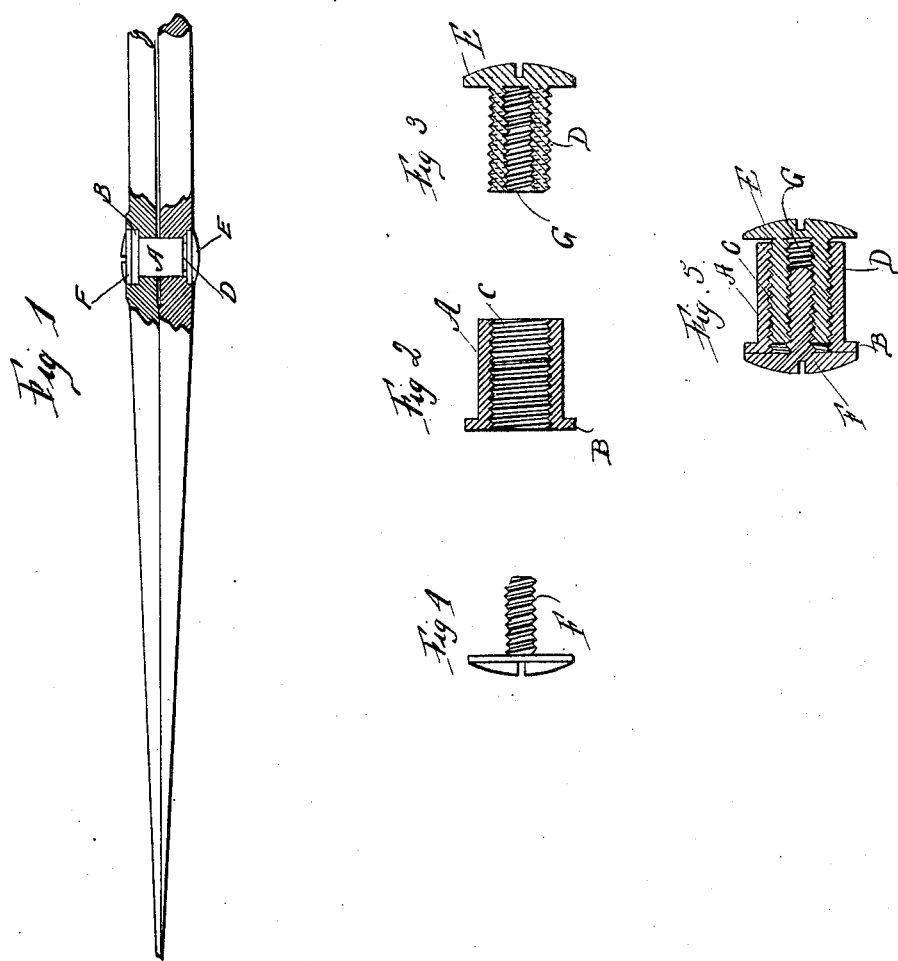
WITNESSES:
INVENTORS
Carl W. Rausch,
Fredrick J. Schwarz Jr.
BY
ATTORNEY

UNITED STATES PATENT OFFICE.

CARL W. RAUSCH AND FREDRICK J. SCHWARZ, JR., OF BRIDESBURG, PENNSYLVANIA.

PIVOT-SCREW FOR SHEARS.

No. 889,966.     Specification of Letters Patent.     Patented June 9, 1908.

Application filed December 19, 1906, Serial No. 348,520. Renewed November 5, 1907. Serial No. 400,861.

*To all whom it may concern:*

Be it known that we, CARL W. RAUSCH and FREDRICK J. SCHWARZ, Jr., citizens of the United States, residing at Bridesburg, county of Philadelphia and State of Pennsylvania, have invented a certain new and useful Improvement in Pivot-Screws for Shears and the Like, of which the following is a specification.

Our invention relates to a new and useful improvement in pivot screws for shears and the like, and has for its object to so construct and arrange a combination of screws as to provide a pair of shears or the like with a pivot which may be adjusted and locked so as to increase or decrease the tension between the two blades.

With these ends in view, this invention consists in the details of construction and combination of elements hereinafter set forth and then specifically designated by the claims.

In order that those skilled in the art to which this invention appertains may understand how to make and use the same, the construction will be described in detail, referring by letter to the accompanying drawing forming a part of this specification, in which—

Figure 1 shows our improvement applied to a pair of shears, a portion of the blades being sectioned away as to clearly show the arrangement of the pivot therein. Fig. 2, a section of the pivot sleeve showing the internal threads therein. Fig. 3, a similar view of the adjusting screw. Fig. 4, an elevation of the locking screw. Fig. 5, a section showing the various elements of the pivot assembled.

In carrying out our invention as here embodied, we provide a sleeve A, which is adapted to pass through the two blades of the shears or like object and serve as the pivot, and this sleeve has a flange B formed thereon and is threaded internally, as indicated at C for the reception of the screw D, which latter is provided with an enlarged head E, this head and the flange B serving to confine the two blades of shears against sidewise displacement.

F represents the locking screw, adapted to be threaded into the screw D, which latter is internally threaded, as indicated at G for that purpose, and when this locking screw is in place the head thereof jams against the flange B so as to create a certain amount of friction between the two, and in practice I prefer that the locking screw shall be threaded right handed, while the external threads of the screw D are left handed; which arrangement will prevent the screws from backing off when the shears are in use, it requiring two screw drivers to remove the screws, one to hold the screw D from turning, while another is used to unscrew the screw F.

Our improvement is especially adapted for the pivots of shears, since the pivot sleeve is free within the blades and may revolve back and forth with the movements of the blades without backing off the screws, thus giving a freedom of movement to the blades and prevent them from binding.

It will be understood that the screw D may be adjusted relative to the sleeve A to any degree desired, and then locked in this adjustment by the jamming of the locking screw F against the flange B, and as these two screws are of opposite threads they will not back off in ordinary use.

Of course we do not wish to be limited to the use of our improvement in connection with shears, as it may be used in various places where it is desirable to provide an adjustable pivot for levers and the like.

Having thus fully described our invention, what we claim as new and useful, is—

1. A pivot for shears and the like consisting of an internally threaded sleeve, a flange formed upon said sleeve, a headed screw adapted to thread into the sleeve, said screw having internal threads of opposite pitch from its external threads and a locking screw adapted to thread into the first named screw and be jammed against the flange of the sleeve whereby the parts will be locked in any adjustment, as specified.

2. An adjustable pivot consisting of a sleeve, threads formed in the interior of said sleeve, a flange formed upon one end of the sleeve, a screw having external threads adapted to engage the internal threads of the sleeve, internal threads formed in said screw of opposite pitch from the external threads of said screw, a head formed upon the screw and a locking screw, the threads of which are adapted to engage the internal threads of the first named screw, said locking screw having a head adapted to be jammed against the flange of the sleeve, as and for the purpose set forth.

In testimony whereof, we have hereunto affixed our signatures in the presence of two subscribing witnesses.

CARL W. RAUSCH.
FREDRICK J. SCHWARZ, Jr.

Witnesses:
HARRY D. VANDEGRIFT,
MANIA E. VANDEGRIFT.